(12) United States Patent
Gaither et al.

(10) Patent No.: US 8,688,890 B2
(45) Date of Patent: Apr. 1, 2014

(54) BIT ORDERING FOR COMMUNICATING AN ADDRESS ON A SERIAL FABRIC

(75) Inventors: Blaine D. Gaither, Ft. Collins, CO (US); Verna Knapp, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2068 days.

(21) Appl. No.: 11/635,316

(22) Filed: Dec. 5, 2006

(65) Prior Publication Data

US 2008/0133834 A1   Jun. 5, 2008

(51) Int. Cl.
*G06F 12/00* (2006.01)
(52) U.S. Cl.
USPC ............... 711/3; 711/211; 711/141; 711/206; 711/E12.002; 711/E12.061; 711/E12.078
(58) Field of Classification Search
USPC ...................................... 711/3, 211, 141, 206
See application file for complete search history.

(56) References Cited

U.S. PATENT DOCUMENTS

| | | | |
|---|---|---|---|
| 6,223,255 B1 * | 4/2001 | Argade | 711/129 |
| 6,256,709 B1 | 7/2001 | Patel et al. | |
| 6,418,525 B1 | 7/2002 | Charney et al. | |
| 6,721,848 B2 | 4/2004 | Gaither | |
| 6,839,807 B2 | 1/2005 | Lee et al. | |
| 6,966,017 B2 | 11/2005 | Evans | |
| 7,155,554 B2 * | 12/2006 | Vinogradov et al. | 710/305 |
| 2004/0039879 A1 | 2/2004 | Gaither | |
| 2004/0133749 A1 | 7/2004 | Yang | |
| 2005/0044326 A1 | 2/2005 | Gaither | |
| 2005/0050277 A1 | 3/2005 | Shen et al. | |
| 2005/0091466 A1 | 4/2005 | Larson et al. | |
| 2005/0177688 A1 | 8/2005 | Gaither et al. | |
| 2005/0240736 A1 | 10/2005 | Shaw | |

* cited by examiner

*Primary Examiner* — Reginald Bragdon
*Assistant Examiner* — Aracelis Ruiz (57) ABSTRACT

A method for handling a request of storage on a serial fabric comprising formatting an address for communication on a serial fabric into a plurality of fields including a field comprising at least one set selection bit and a field comprising at least one tag bit. The address is communicated on the serial fabric with the field comprising the at least one set selection bit communicated first.

22 Claims, 5 Drawing Sheets

BIT ORDERING FOR COMMUNICATING AN ADDRESS ON A SERIAL FABRIC

BACKGROUND

Computer systems often include addressable memory structures, such as cache memory, buffers, and filters, to improve data access speed. For example, a cache memory is a high speed memory system for storing a partial copy of contents of a slower and typically larger memory system. A cache memory system has mapping capability for identifying portions of the larger, slower memory system held in cache, and mapping the identified portions into corresponding locations in the cache.

Some computer systems implement multiple memory handling devices, for example a hierarchy of cache memory systems or combinations of various devices such as caches, buffers, filters, and the like. Many common processors, such as Intel Pentium-II and Pentium-III integrated circuits, have two levels of cache. Some systems have three or more levels of cache memory.

Memory addresses can be relatively long, for example 64 bits or longer. Computer systems are typically optimized to communicate on wide buses or fabric in which an entire address is sent and received on a single clock cycle. The systems are not optimal for conditions in which the fabric is replaced with a serial link and the address can only be communicated in multiple fabric cycles.

SUMMARY

An embodiment of a method for handling a request of storage on a serial fabric comprises formatting an address for communication on a serial fabric into a plurality of fields including at least one line offset bit, at least one set selection bit, and at least one tag bit, and communicating the address on the serial fabric beginning with the at least one set selection bit.

BRIEF DESCRIPTION OF THE DRAWINGS

Embodiments of the invention relating to both structure and method of operation may best be understood by referring to the following description and accompanying drawings.

DETAILED DESCRIPTION

In systems with a serial bus, a long address such as a 64-bit address may span several serial transmissions. A set lookup cannot begin until all bits making up the set-selection bits arrive.

An address has multiple parts with respect to a memory device such as a cache, translation lookaside buffer (TLB), or coherency filter. In an example configuration, an address can comprise line offset bits, set selection bits, and tag bits. Existing systems typically transmit the address bits in the order of the tag bits first, followed by the set selection bits, then the offset bits. The set selection bits are sent in the middle of the address.

Optimal address bit ordering enables a reduction in tag lookup latency in systems with serial fabrics. On such systems with serial fabrics, the technique reduces the time consumed to look up a tag in a device such as a cache, a translation lookaside buffer (TLB), a coherency filter, and the like.

In an illustrative embodiment, the address can be optimally ordered and transmitted down a serial length with the set selection bits sent first, followed by the tag bits, and finally line offset bits, enabling a tag lookup operation to begin sooner. By enabling an earlier start for the tag lookup, one or more clock cycles in cache latency are saved.

Optimal bit ordering reduces the time consumed from arrival of the first data bits on the link until the time that the tag lookup occurs, thereby reducing latency of a cache or other device structure.

Figure 1:
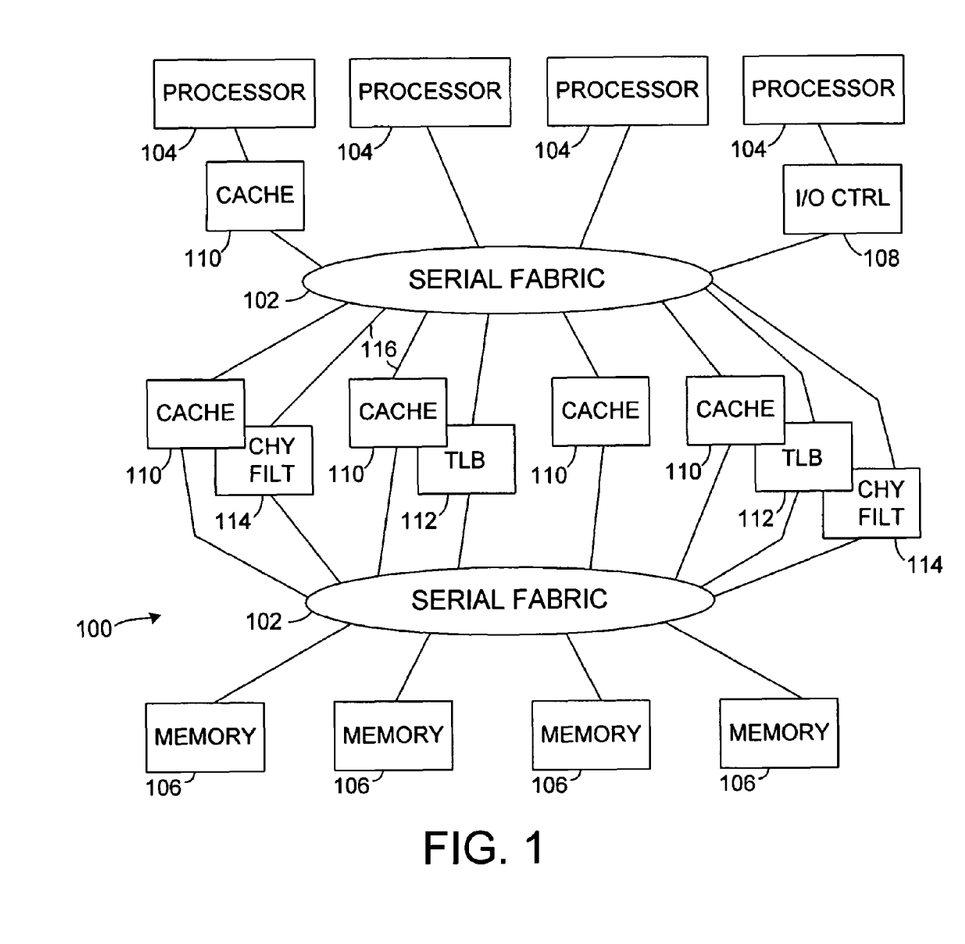
FIG. 1 is a schematic block diagram illustrates an embodiment of a computer system adapted for optimal address bit ordering for reducing tag lookup latency on systems communicating via a serial fabric.
Figure 2:
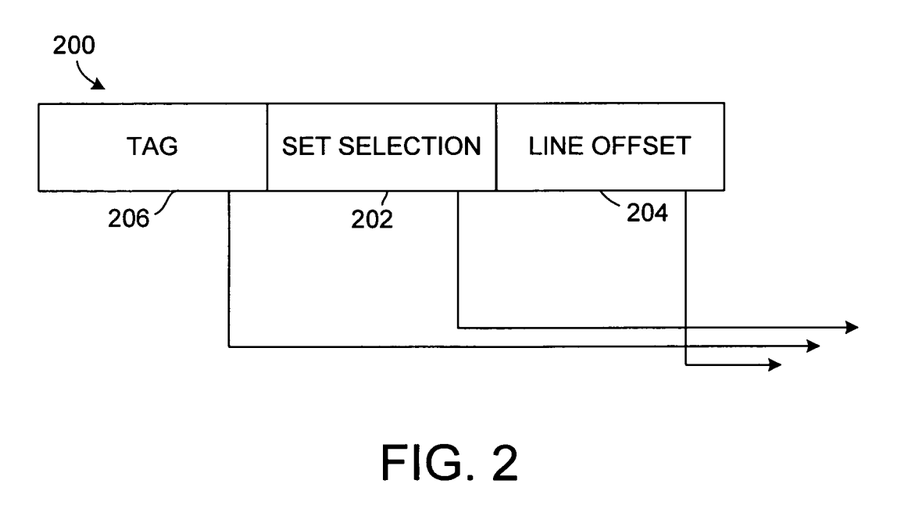
FIG. 2 is a data structure diagram showing an embodiment of an address structure for using in a computer system adapted for optimal address bit ordering.

Referring to FIG. 1, a schematic block diagram illustrates an embodiment of a computer system 100 adapted for optimal address bit ordering for reducing tag lookup latency on systems communicating via a serial fabric 102. The computer system 100 comprises a serial fabric 102 configured to communicate data and/or instructions among multiple processors 104 and multiple memories 106. The computer system 100 further comprises a processor 104 that transmits an address on the serial fabric 102. Referring to FIG. 2, a data structure diagram shows an embodiment of an address structure 200. The address 200 comprises a plurality of fields including a set selection field 202. The processor 104 transmits the address 200 beginning with the set selection field 202.

Referring to FIGS. 1 and 2, in the illustrative embodiment the processor 104 transmits an address 200 comprising a plurality of fields including a line offset field 204, the set selection field 202, and a tag field 206. The processor 104 sends the three fields with the set selection field 202 sent first. In contrast, a conventional system transmits the tag first or possibly the offset.

In an illustrative embodiment, the processor 104 can transmit the address 200 in sequence in a field order of the set selection field 202, the tag field 206, and then the line offset field 204. The line offset field 204 enables selection of bits within a line that are to be referenced. The set selection field 202 is used to index into an array structure. The tag field 206 is used for comparing with tag fields fetched from a tag array structure to establish an array structure hit.

The serial fabric 102 communicates the address over multiple fabric cycles.

The processor 104 can format the address 200 on the serial fabric 102 to optimize a tag look-up operation for serial transfer in devices such as caches 110, translation lookaside buffers (TLBs) 112, and coherency filters 114.

In various configurations and/or arrangements, a processor 104 can connect directly to a cache 110 or can be connected to the cache 110 through the serial fabric 102. Similarly, a serial fabric 102 can be interposed between processor sockets, between processor and processor, and/or between a processor and input/output (I/O) handler.

A cache 110, translation lookaside buffer (TLB) 112, or coherency filter 114 receives the address on a serial line 116 beginning with the set selection field and begins a tag look-up operation immediately upon receipt of set selection field to enable the tag look-up.

A translation lookaside buffer (TLB) 112 is a fixed-size buffer or cache, for example in a processor, which contains parts of a page table for translating virtual addresses into physical addresses, thereby improving speed of virtual address translation. The TLB can include a content-addressable memory (CAM) which uses a virtual address as a search key and produces a corresponding physical address as a search result. If a search results in a match, then the translation is known and match data can be used. If no match exists, translation is sought using the page table, resulting in a slower translation.

A cache coherency filter 114, which can be called a cache accelerator, is a device that can be used to reduce the number of snoops that are made on local caches and can also be used to avoid some snoops of remote resources. The cache coherency filter holds addresses of data stored in all processor caches and information about the state of the data. For example, the state information may describe whether data is owned by a particular cache or cache hierarchy, or shared between multiple caches. Specifically, data owned by an L2 cache is likely to be owned by L1 and L0 caches as well. The coherency filter supplies information relating to coherency state for data in an associated address space based on an identifier for the data. If a remote source sends a memory snoop request to a coherency filter, the coherency filter will only snoop the local caches if a line is held by local caches in a state incompatible with the request type. Similarly, a local request that hits the coherency filter and that has a type of access compatible with the state recorded in the coherency filter need not be snooped in all external caches, but can be forwarded to an appropriate memory controller directly. A snoop engine is configured to snoop for data in the identified coherency domain based on the information and the identifier request type and the address. The information can include coherency state information and possibly ownership information such as owner identifiers (IDs) and ownership type, for example shared or private, and request type. The coherency filter 114 can be used to selectively direct snoops for desired data. In operation, the coherency filter 114 receives an identifier, such as an address 200 that is associated with a data block in memory. The address 200 can correspond to a tag address associated with a transaction for accessing the block of data, for example included with a request or other command by a memory accessing device, such as a processor 104 or I/O controller 108. The memory transaction can correspond to a request such as a read or write request, or another command for accessing the block of data identified by the address 200. The data block can be a line of data such as a cache line, a group of two or more cache lines or any other suitable organizational data structure for storing and transferring data.

The coherency filter 114 controls snoop traffic for the data block in an associated address space. The coherency filter 114 selectively broadcasts a snoop to a selected subset of one or more caches located in a corresponding address region of the address space based on the coherency domain. The coherency filter 114 can receive responses to the snoop which can include a copy of data and an update message. The update message can include information such as ownership, state, status, and other information that enables the coherency filter 114 to update corresponding coherency information and assist later selective snooping for data in appropriate regions of address space.

A cache coherency filter can also function as a filter for an I/O bus that tracks which cache lines are owned on an I/O bus for Peripheral Component Interconnect (PCI) devices or other varieties and standards of I/O devices. When a processor requests a cache line, the interconnect snoops the coherency filter to determine whether that cache line resides in one of the input/output (I/O) interface chips such as a PCI bridge on the I/O bus or other types of I/O handlers which can contain caches. If the cache line is not present in one of the I/O interfaces, then no transaction is run on the I/O bus, reducing snoop traffic on the I/O bus whenever a processor requests data.

Figure 3:
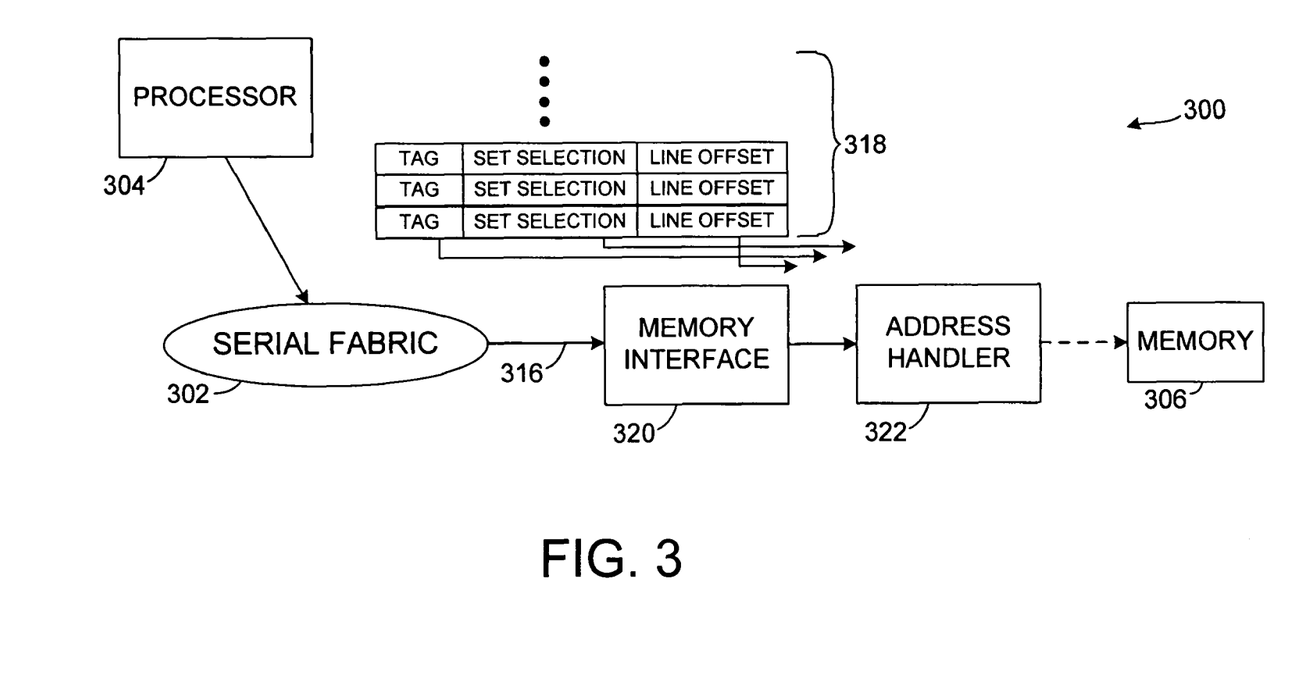
FIG. 3 is a schematic block diagram depicting an embodiment of an apparatus adapted for optimal address bit ordering for reducing tag lookup latency on systems communicating via a serial fabric.

Referring to FIG. 3, a schematic block diagram depicts an embodiment of an apparatus 300 adapted for optimal address bit ordering for reducing tag lookup latency on systems communicating via a serial fabric 302. The apparatus 300 comprises an interface 320 configured for handling a request of storage on a serial fabric 302. The interface 320 comprises an address handler 322 configured to transmit and/or receive an address 200 communicated on a serial line 316. The address 200, as shown in FIG. 2, comprises a plurality of fields including at least one line offset bit 204, at least one set selection bit 202, and at least one tag bit 206. A remote processor makes a request on the serial fabric 302 to invoke a snoop or other pertinent access of a cache, translation lookaside buffer (TLB), coherency filter, and the like in another processor or I/O controller. Other pertinent accesses can include reads, writes, or other accesses that involve look-up of information in a target device by using the address. The address handler 322 transmits and/or receives the address 200 on the serial line 316 with a field comprising the one or more set selection bits 202 sent first. The set selection bit field 202 is considered to be communicated first when all set selection bits in the field are communicated before any other field is entirely transmitted. For example, a configuration that sends one bit or otherwise fewer bits than all bits in a field of a field other than the set selection bit field, but that completes communication of the set selection bit field first is considered to have communicated the set selection bit field first. Similarly, a configuration that sends multiple-bit bytes or words in a serial stream can be considered to communicate the set selection bits first when communication of all set selection bits is completed when any bit of other fields remains to be yet communicated. For example, an address with twelve set selection bits is considered to be communicated first if a first eight-bit byte includes four tag or offset bits and four set selection bits, a second byte includes the eight remaining set selection bits, and remaining tag and/or offset bits are included in subsequent bytes.

The apparatus 300 can be any suitable device or component for usage in a data processing system, for example a computing system, a communication system, a storage system, or the like. The apparatus further can comprise a processor 304 and an instruction pipeline 318 that executes processor instructions for accessing a memory 306 identified by the address.

In various embodiments, the address handler 322 can be any suitable logic, for example, electronic logic circuits, state machines, array logic, firmware, software, and the like, that can be implemented in a device or component that transmits a request, such as a processor, a memory interface unit, and the like, or can be implemented in a device or component that receives a request, such as a cache, a translation lookaside buffer, a coherency filter, and the like.

In various implementations, the address handler 322 transmits and/or receives the address on a serial line 316 wherein the address is communicated in multiple fabric cycles.

The address handler 322 is adapted to optimize a tag look-up operation for serial transfer in devices such as caches, translation lookaside buffers (TLBs), coherency filters, and the like.

The address handler 322 transmits the address so that all set selection bits 202 are communicated prior to sending other fields such as tag bits 206 and/or offset bits 204. Specifically, a final set selection bit 202 is sent before the last tag bit 206 or the last offset bit 204. In an illustrative configuration, the address handler 322 can transmit and/or receive the address 200 on the serial line in sequence in a bit order of the one or more set selection bits 202, the one or more tag bits 206, and the one or more line offset bits 204. In some embodiments and/or in some conditions, the address handler 322 transmits and/or receives the address on the serial line in sequence in a bit order wherein a last set selection bit is transmitted before a last tag bit and transmitted before a last line offset bit.

For a device or component that receives an address 200 on the serial fabric 302, for example a cache, translation lookaside buffer, a coherency filter, or the like, the address handler 322 receives the address on the serial line 316 beginning with the one or more set selection bits and begins a tag look-up operation immediately upon receipt of sufficient set selection bits to enable the tag look-up.

Figure 4A:
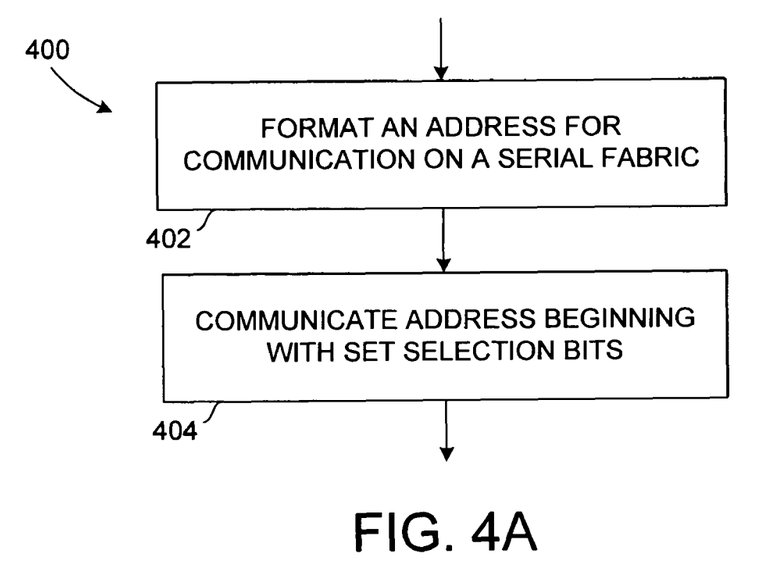
FIGS. 4A, 4B, and 4C are schematic flow charts illustrating embodiments of methods for handling a request of storage on a serial fabric.

Referring to FIG. 4A, a schematic flow chart depicts an embodiment of a method for handling 400 a request of storage on a serial fabric comprises formatting 402 an address for communication on a serial fabric into a plurality of fields including a field comprising at least one set selection bit and a field comprising at least one tag bit. The address is communicated 404 on the serial fabric with the field comprising the at least one set selection bit completely communicated first.

Figure 4B:
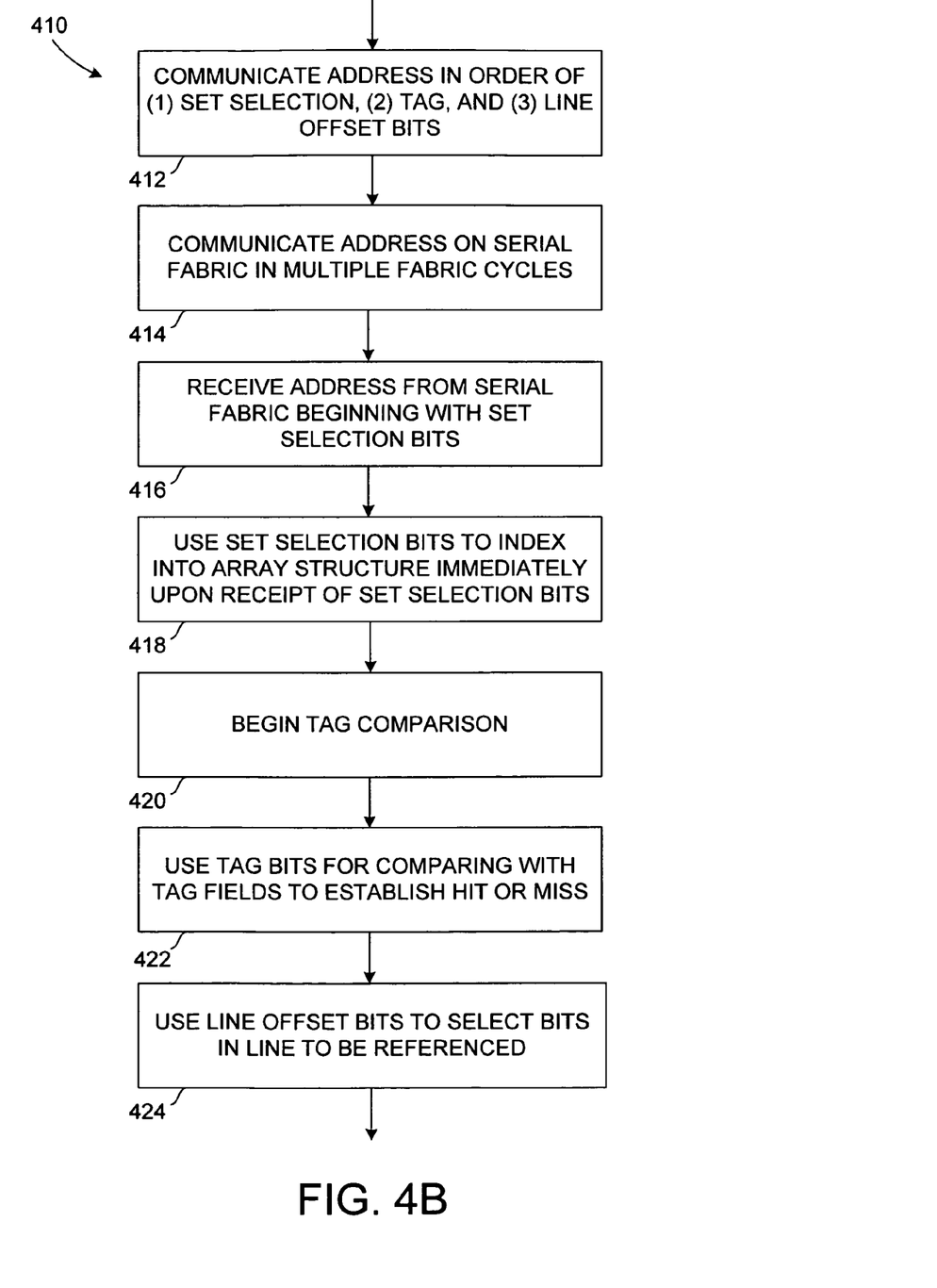

In FIG. 4B, a flow chart shows another embodiment of a method for handling 410 a storage request on a serial fabric. The method 410 comprises communicating 412 an address on the serial fabric in sequence in a bit order of set selection bits, tag bits, and line offset bits. The address is communicated 414 on the serial fabric in a plurality of fabric cycles and the address is received 416 from the serial fabric beginning with the set selection bits. One or more set selection bits are used 418 to index into an array structure immediately upon receipt of set selection bits. A tag comparison operation is begun 420 upon receipt of sufficient set selection bits to enable the tag comparison. A tag comparison can begin before all tag bits have arrived. Accordingly, the illustrative method enables parallel execution of the set selection and transmission of tags. One or more one tag bits can be used 422 for comparing with tag fields fetched from a tag array structure to establish a hit, and one or more line offset bits can be used 424 to select bits within a line that are to be referenced.

Figure 4C:
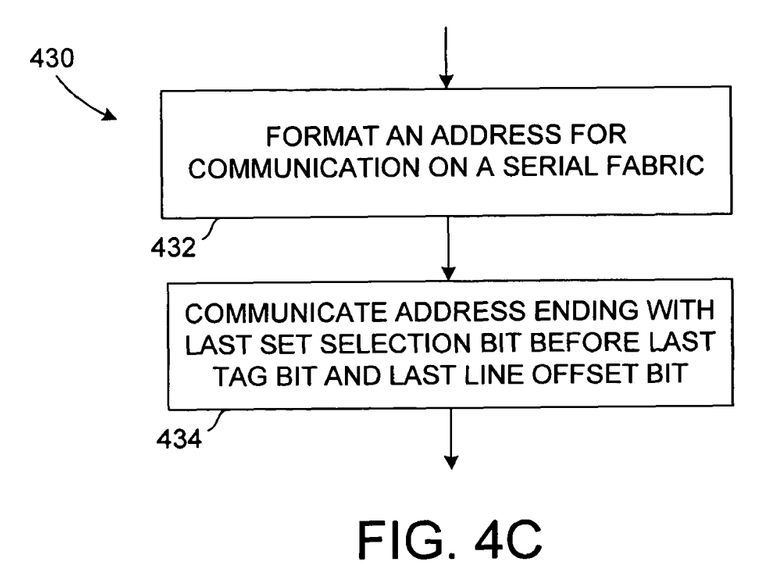

Referring to FIG. 4C, a schematic flow chart depicts an embodiment of a method for handling 430 a request of storage on a serial fabric comprises formatting 432 an address for communication on a serial fabric into a plurality of fields including a field comprising at least one set selection bit and a field comprising at least one tag bit. The address can be communicated 434 on the serial fabric ending with a last set selection bit before a last tag bit and before a last line offset bit. Accordingly, the illustrative method enables communication whereby the last bit of the set selection bits arrives before the last bit of the tags.

The various functions, processes, methods, and operations performed or executed by the system can be implemented as functions that are executable on various types of logic, processors, controllers, central processing units, microprocessors, digital signal processors, state machines, programmable logic arrays, and the like. The functions can be implemented in an electronic logic or stored on any computer-readable medium for use by or in connection with any computer-related system or method. A logic can be an electronic circuit, logic array, state machine, programmable logic array, and the like. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict logic steps or blocks that may represent logic circuits, modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The illustrative functionality can be more suitably implemented in hardware as logic circuits than in code or executable instructions due to higher speeds that are typically attained in a hardware implementation.

A possible firmware implementation may specify reordering of address bits in a circuit in firmware that executes at initial startup of the system. Ordering may thereafter be set in the hardware circuits until a next system reset.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. An apparatus comprising:
   an interface implemented at least partly in hardware and configured for handling a request for storage on a serial fabric, comprising:
   an address handler configured to communicate an address on a serial line of the serial fabric, the address comprising a plurality of fields including a field comprising at least one set selection bit and a field comprising at least one tag bit, the address handler configured to communicate the address on the serial line with the field comprising at least one set selection bit being communicated first, wherein the address handler is configured to communicate the address on the serial line in a plurality of fabric cycles.

2. The apparatus according to claim 1 further comprising:
   an array structure having lines, wherein the address further comprises a field comprising at least one line offset bit to select bits within a line that is to be referenced, wherein the line is one of the lines in the array structure;
wherein the field comprising the at least one set selection bit is to index into the array structure; and
wherein the field comprising the at least one tag bit is for comparing with a retrieved tag field to establish a hit.

3. The apparatus according to claim 1, wherein the address handler is configured to optimize a tag look-up operation responsive to the address communicated over the serial line, in a device selected from the group consisting of a cache, a translation lookaside buffer (TLB), and a coherency filter.

4. The apparatus according to claim 1, wherein the address handler is configured to begin a tag look-up operation immediately upon receipt of the field including the at least one set selection bit, wherein the tag look-up operation is associated with access of one of a cache, translation lookaside buffer, and coherency filter.

5. The apparatus according to claim 1, wherein the address handler is configured to communicate the address on the serial line in sequence in a bit order wherein a last set selection bit is transmitted before a last tag bit and transmitted before a last line offset bit.

6. The apparatus according to claim 1 further comprising:
a processor; and
an instruction pipeline to execute processor instructions for accessing memory identified by the address.

7. An apparatus comprising:
an interface implemented at least partly in hardware and configured for handling a request for storage on a serial fabric, comprising:
an address handler configured to communicate an address on a serial line of the serial fabric, the address comprising a plurality of fields including a field comprising at least one set selection bit and a field comprising at least one tag bit, the address handler configured to communicate the address on the serial line with the field comprising at least one set selection bit being communicated first; and
an array structure having lines,
wherein the address further comprises a field comprising at least one line offset bit to select bits within a line that is to be referenced, wherein the line is one of the lines in the array structure;
wherein the field comprising the at least one set selection bit is to index into the array structure;
wherein the field comprising the at least one tag bit is for comparing with a retrieved tag field to establish a hit; and
wherein the address handler is configured to communicate the address on the serial line in sequence in a bit order of the at least one set selection bit, the at least one tag bit, and the at least one line offset bit.

8. A computer system comprising:
a plurality of processors;
a plurality of memories;
a serial fabric configured to communicate data and/or instructions among the plurality of processors and the plurality of memories; and
a particular one of the processors configured to transmit an address on the serial fabric, the address comprising a plurality of fields including a set selection field, the particular processor configured to transmit the address beginning with the set selection field, the set selection field used for indexing into one of multiple lines in an array structure,
wherein the serial fabric is configured to communicate the address in a plurality of fabric cycles.

9. The computer system according to claim 8, wherein the particular processor is configured to transmit the address that further comprises a line offset field and a tag field, wherein the address is transmitted beginning with the set selection field before the line offset field and tag field.

10. The computer system according to claim 9, wherein the particular processor is configured to transmit the address in sequence in a field order of the set selection field, the tag field, and the line offset field.

11. The computer system according to claim 8, wherein the particular processor is configured to transmit the address that further comprises a line offset field to select bits within a line of the array structure and a tag field for comparing with a fetched tag field to establish a hit.

12. The computer system according to claim 8, wherein the address is formatted to optimize a tag look-up operation in a device selected from the group consisting of a cache, a translation lookaside buffer (TLB), and a coherency filter.

13. The computer system according to claim 8 further comprising:
a cache responsive to the address on the serial fabric by beginning a tag look-up operation associated with access of the cache immediately upon receipt of the set selection field.

14. The computer system according to claim 8 further comprising:
a translation lookaside buffer (TLB) responsive to the address on the serial fabric by beginning a tag look-up operation associated with access of the TLB immediately upon receipt of the set selection field.

15. The computer system according to claim 8 further comprising:
a coherency filter responsive to the address on the serial fabric by beginning a tag look-up operation associated with access of the coherency filter immediately upon receipt of set selection field.

16. The computer system of claim 8, wherein the particular processor is configured to transmit the address by transmitting the set selection field first before others of the plurality of the fields.

17. A method for handling a request of storage on a serial fabric comprising:
formatting an address for communication on the serial fabric into a plurality of fields including a field comprising at least one set selection bit and a field comprising at least one tag bit; and
communicating the address on the serial fabric beginning with the field comprising the at least one set selection bit, wherein the address is communicated on a serial line of the serial fabric in a plurality of fabric cycles.

18. The method according to claim 17, wherein the field comprising the at least one set selection bit is used to index into an array structure, wherein the address further comprises:
a field comprising at least one line offset bit to select bits within a line of the array structure, and a field comprising at least one tag bit to compare with a retrieved tag field to establish a hit;
wherein communicating the address comprises communicating the address on the serial fabric in sequence in a bit order of the at least one set selection bit, the at least one tag bit, and the at least one line offset bit.

19. The method of claim 18, wherein the address is transmitted by a first device, the method further comprising:
receiving the address by a second device over the serial fabric;

upon receipt of the field comprising the at least one set selection bit, indexing into the line of the array structure; and upon later receipt of the field comprising the at least one tag bit, comparing the at least one tag bit with the tag field retrieved from the line of the array structure.

20. The method of claim 17, wherein communicating the address comprises communicating, by a processor, the address by sending the field comprising the at least one set selection bit first before others of the plurality of fields.

21. A non-transitory computer-readable storage medium having instructions embodied therein for handling a request for storage on a serial fabric, the instructions executable by a computer to cause the computer to:

format an address for communication on the serial fabric into a plurality of fields including a field comprising at least one set selection bit and a field comprising at least one tag bit; and communicate the address on the serial fabric beginning with the field comprising the at least one set selection bit, wherein the address is communicated on a serial line of the serial fabric in a plurality of fabric cycles.

22. The computer-readable storage medium of claim 21, wherein communicating the address comprises communicating the address by sending the field comprising the at least one set selection bit first before others of the plurality of fields.

\* \* \* \* \*